Sept. 6, 1955 J. M. ANDREW 2,717,145
STRETCHER JACK
Filed Oct. 12, 1953
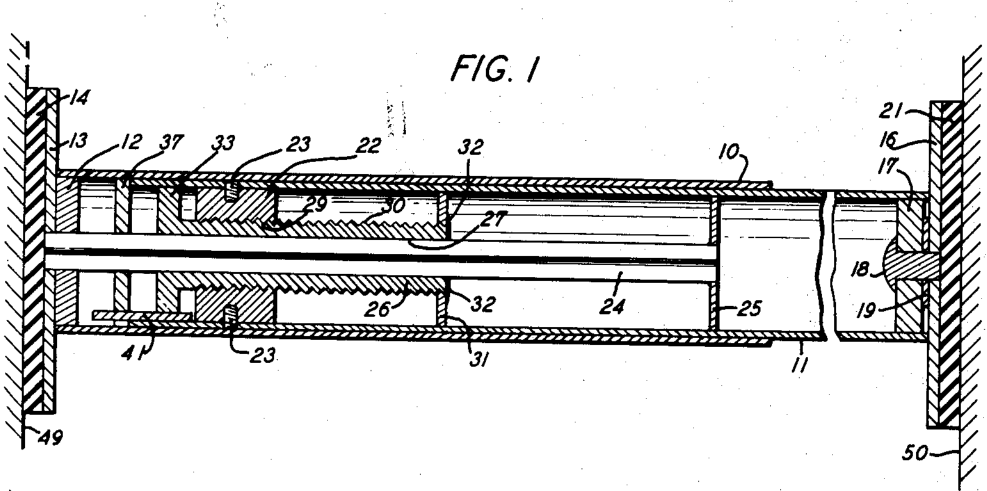
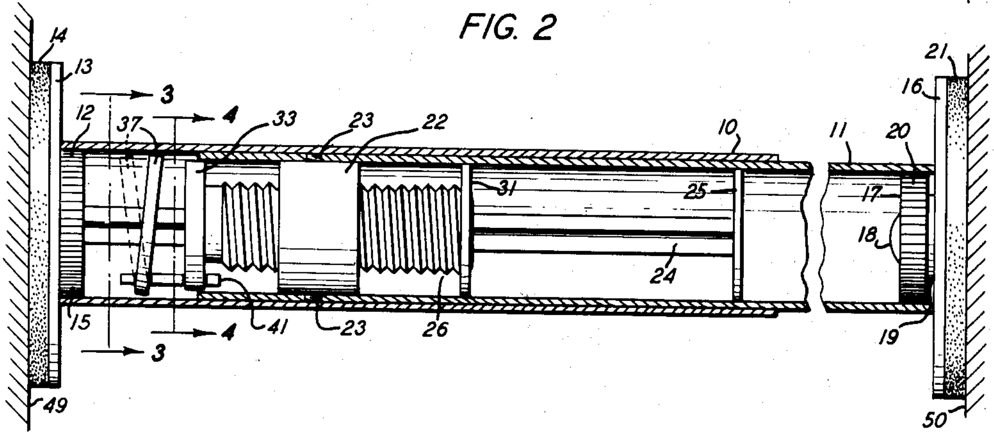
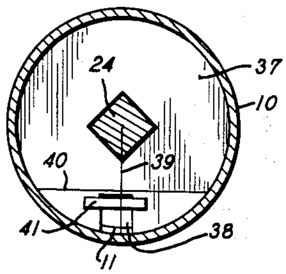
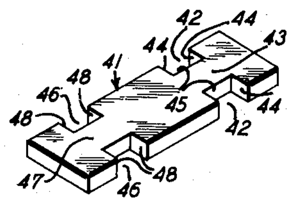
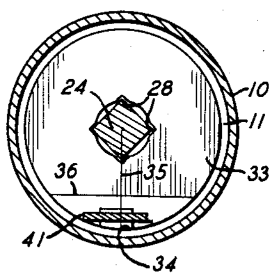
JAMES M. ANDREW
INVENTOR.
BY Percy H Moore
ATTORNEY

United States Patent Office 2,717,145

Patented Sept. 6, 1955

1

2,717,145

STRETCHER JACK

James M. Andrew, Findlay, Ohio

Application October 12, 1953, Serial No. 385,533

6 Claims. (Cl. 254—98)

The present invention relates to improvements in a stretcher jack and has for an object the provision of a device of this kind which is an improvement both structurally and operationally over the stretcher jack disclosed in my U. S. Patent No. 1,941,378 granted on December 26, 1933.

In the patented device the clutching disk when in its non-clutching position at times binds on the bar due to rotation of the screw member and thus prevents the telescopic movement of the tubings. It is one of the objects of the present invention to eliminate this drawback of the patented device.

Another object of the present invention is to provide an improved stretcher jack in which the locking or clutching disk is more quickly and more positively moved to its locking and unlocking positions by increasing the leverage.

The present invention aims to provide an improved device of this type in which means are provided for limiting the travel of the nut on the screw member in both directions and means are provided to prevent accidental separation of the telescopic tubes.

The present invention also aims to provide an improved structure in which the load bearing efficiency of the screw member supporting rod is increased.

With the foregoing and other objects in view, the invention will be hereinafter more fully described and more particularly pointed out in the appended claims.

In the drawings, in which the same parts are denoted by the same reference numerals throughout the several views, Figure 1 is a longitudinal sectional view of the improved device constructed in accordance with the invention and showing the locking disk in its released position, Figure 2 is a side elevational view with parts in section and showing the locking disk in its locked position, Figure 3 is a sectional view taken on the line 3—3 of Figure 2, Figure 4 is a sectional view taken on the line 4—4 of Figure 2, and Figure 5 is a perspective view of the coupling member.

Referring more particularly to the drawings, 10 indicates an outer tube and 11 an inner tube of a pair of telescoped tubes. The outer face of a supporting disk 12 is secured as by welding or the like to the inner face of a backing disk 13 to the outer face of which may be affixed in any suitable manner a resilient friction pad 14 of rubber or the like. The diameter of the supporting disk 12 and the inside diameter of the tube 10 are such that the disk 12 may have a tight frictional fit within the outer end of the tube 10 and this frictional fit may be augmented by roughening the periphery of the disk 12 as indicated at 15.

A backing disk 16 has a supporting disk 17 pivotally connected thereto by a pivot 18 which may be in the form of a loose rivet. A washer 19 is arranged between the disks 16 and 17 to decrease friction between the

2 disks during relative rotation thereof. The diameter of the supporting disk 17 and the inside diameter of the tube 11 are such that the disk 17 may have a tight frictional fit within the outer end of the tube 11 and this frictional fit may be increased by making the peripheral edge of the disk 17 rugose as indicated at 20. A resilient friction pad 21 may be attached to the outer face of the disk 16.

A nut 22 is secured on the interior of the inner tube 11 adjacent the inner end of the tube 11. The nut may be secured in place by screws 23 or it may be welded in place or secured in any other suitable manner. A rod 24 has its outer end portion extending through suitable openings in the supporting disk 12 and backing disk 13 and is secured by welding or the like thereto. The rod 24 is non-circular in cross section and in the present instance is illustrated as being square in cross section.

A stop disk 25 is fixed by welding or the like to the inner end of the rod 24 and has a diameter substantially the same as the inside diameter of the tube 11 so that the disk 25 engages the inner wall of the tube 11 and helps to support the rod 24 and serves as a guide for the tube 11 during its axial movements into and out of the tube 10.

A screw member 26 is carried by the rod 24 and has a through axial passageway 27 which is of broached square shape in cross section as indicated at 28 in Figure 4 of the drawings so that the screw member 26 cannot rotate with respect to the rod 24. The nut 22 and the screw member 26 are provided with interior screw threads 29 and exterior screw threads 30, respectively, so that they have screw threaded engagement with one another.

An abutment member 31 which may be in the form of a circular washer having a screw threaded opening therein is positioned on the inner end portion of the screw member 26 and may be secured to the screw member by welding 32 or in any other suitable manner. The diameter of the abutment and the inside diameter of the tube 11 is such that the tube has a sliding fit on the abutment so that the abutment aids in supporting the screw member 26 and the rod 24.

A flange or head 33 is carried by the outer end of the screw member 26 and may be formed integral with the screw member or secured thereto in any appropriate manner. The head 33 is circular and has a diameter slightly less than the inside diameter of the tube 11. A part of the under peripheral portion of the head 33 is cut away to form a recess 34 which extends along a radius 35 of the head 33 and the width of which recess extends in the direction of a chord 36 of the head 33, as can be seen from Figure 4 of the drawings. The widthwise center of the recess is laterally offset from the radius of the head along which the recess extends.

A clutching or locking disk 37 is carried by the rod 24 and has a square shaped opening therein for interfitting with the rod 24. A part of the under peripheral portion of the disk 37 is cut away to form a recess 38 which extends along a radius 39 of the disk 37 and the width of which recess extends in the direction of a chord 40 of the disk 37 as is shown in Figure 3 of the drawings. The widthwise center of the recess 38 is laterally offset from the radius 39 of the disk 37 along which the recess extends.

The screw member 26 and the locking disk 37 are coupled together by a coupling member generally indicated at 41 and which is illustrated in detail in Figure 5 of the drawings. The member 41 may be in the form of a flat bar and adjacent one end thereof has therein a pair of recesses 42 and are separated by a portion 43 of the bar. The recesses 42 open through opposite edges of the bar. The recesses 42 receive the portions of the head 33 which are adjacent the recess 34. The width of the portion 43 is substantially the same as that of the recess 34, the length of the recesses 42 is the same as the thickness of the head 33 and the side walls 44 and the bottom walls 45 of the recesses 42 are straight so that the head 33 has a tight frictional fit with the coupling member 41.

Adjacent the opposite end of the bar 41 there is formed a pair of recesses 46 which are separated by a portion 47 of the bar and the recesses open through opposite edges of the bar. The recesses 46 receive the portions of the locking disk 37 which are adjacent the recess 38. The width of the portion 47 is less than that of the recess 38 of the disk 37 and the length of the recesses 46 is greater than the thickness of the disk 37 so that the disk 37 can be tilted to the canted positions shown in full and dotted lines in Figure 2 of the drawings. The side walls 48 of the recesses are straight and parallel to each other.

In the use of the device, assuming that it is desired to suspend the stretcher jack between opposed walls 49 and 50 of a closet, wardrobe or the like and that the parts are in the position shown in Figure 1 of the drawings, the tube 11 will be rotated with one hand in a counterclockwise direction while the tube 10 is held stationary with the other hand. This action will cause the resilient pads 14 and 21 to be forced into tight frictional engagement with the walls 49 and 50. At the same time the inner end of the tube 11 will retreat from its engagement with the locking disk 37 until the locking disk is free to tilt in either direction to become jammed or locked with the rod 24 as shown in Figure 2 of the drawings.

The locking disk will be moved to the full line or dotted line position indicated in Figure 2 of the drawings when the tubes 10 and 11 are moved slightly axially in either direction relative to each other. If the inner tube 11 is moved inwardly of the tube 10, the nut 22 will move the screw member 26 and its head 33 inwardly so that the coupling member 41 will move the lower portion of the locking disk 37 inwardly and thereby swing the upper portion of the locking disk outwardly to the full line position shown in Figure 2 at which time the disk 37 will be locked to the rod 24 and further inward movement of the tube 11 will be prevented. If an attempt is made to withdraw the tube 11 outwardly from the tube 10, the coupling member will be moved slightly outwardly and will move the lower portion of the disk 37 outwardly and the upper portion of the disk 37 inwardly to the dotted line position shown in Figure 2, in which position the disk 37 is locked to the rod 24 and further outward movement of the tube is prevented.

When it is desired to move the tubes 10 and 11 axially with respect to each other, the tube 10 is held against rotation and the tube 11 is rotated in a clockwise direction so that the nut 22 travels inwardly on the screw member 26 and carries the inner tube 11 with it until the inner end of the tube 11 engages either the upper or lower portion of the locking disk 37, depending upon whether the locking disk is in the full line or dotted line position of Figure 2. This engagement of the tube 11 with the disk 37 upon further inward movement thereof will move the disk 37 to its upright position, as shown in Figure 1 of the drawings so that the disk 37 is unlocked from the rod 24 and the tube 11 may be freely moved axially in either direction.

In this way the resilient pads 14 and 21 will be held in tight frictional engagement with the walls 49 and 50 to securely suspend the stretcher jack between the walls. Since the passageway 27 is of a broached square shape, the screw member 26 cannot rotate on the rod 24 and the recess 34 in the head 33 of the screw member 26 is laterally offset with respect to the radius 35 so that even the slightest rotation of the screw member and coupling member 41 is eliminated.

It will be noted that the coupling member 41 is a flat bar which is connected to the locking disk closely adjacent to its lower peripheral edge so that the distance between the rod 24 and the point of application of force to the locking disk 37 for tilting the locking disk is the maximum. This structure increases the leverage and results in a quicker and more positive locking and unlocking action of the locking disk 37. It will also be noted that the side walls of the recess 46 of the coupling member 41 are straight and parallel so that the area of these side walls that bear against the locking disk 37 are the maximum. This arrangement increases the leverage action.

The abutment member 31 and the head 33 will limit the axial movement of the nut 22 in both directions to prevent escape of the nut 22 from the screw member 26. The abutment member 31 in cooperation with the stop disk 25 will prevent the accidental separation of the tubes 10 and 11. The supporting disk 12, the abutment member 31, the stop disk 25 and the nut 22 will act in the same manner as the cross member or the struts in a span so as to increase the load bearing efficiency of the rod 24.

It is obvious that various changes and modifications may be made in the details of construction and design of the above specifically described embodiment of this invention without departing from the spirit thereof, such changes and modifications being restricted only by the scope of the following claims.

What I claim is:

1. A stretcher jack comprising a pair of telescoped tubes adapted to be freely axially slidable with respect to each other and adapted to be forced in opposite directions by relative rotation of the tubes, a guide rod fixedly mounted against rotation and having a non-circular shape in cross section, means associated with one of said tubes for forcing said tubes in opposite directions axially by the relative rotation of said tubes and comprising an element having a through non-circular bore through which said rod extends and at all times interlocks so that said element is fixed against rotation, locking means for preventing the free relative axially slidable movement of said tubes when in its operative position and for permitting the free relative axially slidable movement of said tubes when in its inoperative position, and coupling means between said element and said locking means for moving said locking means to its operative position when said tubes tend to freely axially slide with respect to each other, said one of said tubes adapted to engage said locking means to move said locking means to its inoperative position when said tubes are relatively rotated.

2. A stretcher jack comprising a pair of telescoped tubes capable of being freely slidable with respect to each other and to be forced in opposite directions by relative rotation of the tubes, means for forcing said tubes in opposite directions axially comprising a rod fixedly carried by one of said tubes against rotation, a screw member having a bore therethrough receiving said rod, said bore and rod being of non-circular shape in cross section to prevent rotation of said screw member, and a nut fixed to the other of said tubes for travelling on said screw member, a locking disk on said rod and having a non-circular opening therethrough cooperating with said rod to prevent rotation of the locking disk, and a substantially flat coupling member connected to said screw member adjacent one end of the coupling member and having a pair of recesses adjacent its opposite end, said locking disk having a cut away portion in its outer periphery providing two portions which are received by the recesses in said coupling member, said recesses having straight sided walls and having a length greater than the thickness of said portions of said disk, each of said recesses having a width greater than the width of each of said portions, whereby a lost motion connection is provided between said coupling member and said disk.

3. A stretcher jack as claimed in claim 2 wherein said screw member has a head on one end for attachment to said coupling member and for limiting the movement of said nut in one direction and an abutment on its other end to limit the movement of the nut in the opposite direction, and wherein a stop disk is carried by the free end of said rod for engaging said abutment for preventing separation of said tubes.

4. A stretcher jack as claimed in claim 3 wherein the head of the screw member is provided with a slot extending along a radius of said head for receiving said one end of said coupling member, the widthwise center of said slot being laterally offset from said radius of said head.

5. A stretcher jack as claimed in claim 4 wherein the cut away portion of said locking disk provides a recess extending along a radius of said locking disk and having its widthwise center laterally offset from said radius.

6. A stretcher jack as claimed in claim 4 wherein a supporting disk is secured to and supports the fixed end of said rod, and the lower peripheries of said nut, abutment and stop disk engage the inner face of said other tube, thereby increasing the load bearing efficiency of said rod.

References Cited in the file of this patent

UNITED STATES PATENTS

| | | |
|---|---|---|
| 405,899 | Maschmeyer | June 25, 1889 |
| 1,941,378 | Andrew | Dec. 26, 1933 |
| 2,664,259 | Rose | Dec. 29, 1953 |